(12) United States Patent
Poppell

(10) Patent No.: US 6,250,662 B1
(45) Date of Patent: Jun. 26, 2001

(54) BOAT TRAILER HAVING ALUMINUM ADJUSTABLE BUNKS

(75) Inventor: L. Ralph Poppell, Ft. Pierce, FL (US)

(73) Assignee: Float-On Corporation, Ft. Pierce, FL (US)

( * ) Notice: Subject to any disclaimer, the term of this patent is extended or adjusted under 35 U.S.C. 154(b) by 0 days.

(21) Appl. No.: 09/177,123

(22) Filed: Oct. 22, 1998

Related U.S. Application Data

(63) Continuation-in-part of application No. 09/001,920, filed on Dec. 31, 1997, now abandoned.

(51) Int. Cl.⁷ .................................................. B60P 3/10
(52) U.S. Cl. .................................. 280/414.3; 280/414.1
(58) Field of Search ..................... 280/414.1, 414.3; 414/482; 114/344; D12/101

(56) References Cited

U.S. PATENT DOCUMENTS

| | | | |
|---|---|---|---|
| 3,917,087 | * 11/1975 | Godbersen | 280/414.1 |
| 3,993,324 | * 11/1976 | Carrick | 280/414.1 |
| 4,464,092 | * 8/1984 | Chambers et al. | 280/414.1 |
| 5,002,299 | * 3/1991 | Firehammer et al. | 280/414.1 |
| 5,060,963 | * 10/1991 | Godbersen | 280/414.1 |
| 5,165,706 | * 11/1992 | Fond | 280/414.1 |
| 5,299,903 | * 4/1994 | Kesselring | 280/414.1 |
| 5,429,383 | * 7/1995 | Reed | 280/414.1 |
| 5,632,504 | * 5/1997 | Gallagher | 280/414.1 |
| 5,823,559 | * 10/1998 | Priesgen et al. | 280/414.1 |
| 6,079,729 | * 6/2000 | Braun | 280/414.1 |
| 6,113,124 | * 6/2000 | Chambers | 280/414.1 |

* cited by examiner

Primary Examiner—Daniel G. DePumpo
(74) Attorney, Agent, or Firm—Oblon, Spivak, McClelland, Maier & Neustadt, P.C.

(57) ABSTRACT

A boat trailer formed of aluminum sections includes aluminum bunks formed of simple T shaped components bracketed to the trailer support assembly in an adjustable fashion. The bunks can be one piece or two piece bunks. In the case of two-piece bunks, standard components can be used for both the base part and the cross part.

6 Claims, 5 Drawing Sheets

BOAT TRAILER HAVING ALUMINUM ADJUSTABLE BUNKS

CROSS REFERENCE TO RELATED APPLICATIONS

The present application is a continuation in part of U.S. patent application Ser. No. 09/001,920 filed Dec. 31, 1997, now abandoned.

BACKGROUND OF THE INVENTION

1. Field of the Invention

The present invention relates to bunks for boat trailers.

2. Description of the Related Art

Boat trailers, particularly but not limited to those for transporting power boats, have long been known. Typically, such trailers are formed of aluminum section members mounted on a wheeled carriage and include support elements, called bunks, upon which the hull of the boat rests.

While the frames of boat trailers are conventionally formed of galvanized steel or aluminum sections, in the case of frames formed of aluminum sections the bunks have traditionally been formed of wood. However, wood is not an ideal material for use in boat trailers, particularly due to its appearance, buoyancy and tendency to warp or rot under marine conditions.

There has therefore been a long felt need for aluminum bunks for boat trailers. However, practical aluminum bunks have heretofore not existed since it was believed that bunks having sufficient strength to withstand the loads applied by the transport of heavy boat hulls required the use of expensive and complex multi-wall aluminum assemblies. Since practical aluminum bunks must have high strength and adjustability, and yet be simple and inexpensive, practical constructions were unknown.

SUMMARY OF THE INVENTION

It is an object of the present invention to provide about trailer having an aluminum or aluminum alloy bunk.

It is another object of the present invention to provide a boat trailer having an aluminum or aluminum alloy bunk which is simple and inexpensive.

It is a further object of the invention to provide a method for manufacturing a boat trailer, having an aluminum or aluminum alloy bunk, and using standardized parts.

According to a feature of the invention, the above and other objects are carried out by providing a boat trailer comprising an aluminum support assembly, a plurality of road wheels for supporting the support assembly, a hitch mechanism for hitching the support assembly to a vehicle, and a plurality of bunks supported by the support assembly for supporting a boat hull, wherein at least one of the bunks is at least in part formed of aluminum or an aluminum alloy.

According to further features of the invention, the at least one bunk has a substantially T-shaped cross-section, particularly one comprised by a substantially vertically oriented aluminum or aluminum alloy based part mounted to the support assembly and a separate cross part mounted to the base part for supporting a boat hull.

The cross part may include two reinforcing yoke members forming an elongate groove in which a top of the base part is secured. Brackets may be mounted on opposite sides of the base part and have reinforcing legs for reinforcing the base part. The brackets may be adjustably mounted to cross members of the support assembly.

According to a further feature of the invention, the above and other objects are carried out by a method for manufacturing a trailer, comprising the steps of storing a plurality of cross parts of standardized sizes and shapes, storing a plurality of base parts in the form of elongate aluminum or aluminum alloy plates of standardized sizes, assembling an aluminum support assembly, a plurality of road wheels for supporting the support assembly and a hitch mechanism for hitching the support assembly to a vehicle, selecting ones of the cross parts and base parts having desired characteristics, assembling the selected cross parts and base parts to form at least one bunk having a substantially T-shaped cross section, and assembling the bunk to the support assembly.

According to the invention, the bunk is formed of simple, lightweight and inexpensive aluminum or aluminum alloy components. The base part is simply a planar, rectangular aluminum section whose length and width can be selected according to the necessary requirements. It is reinforced by the legs of brackets of a standardized construction. Standardized cross parts can also be provided, and have a reinforcing yoke. The bunk can therefore be formed of a small number of standardized parts, can be simple, lightweight and inexpensive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
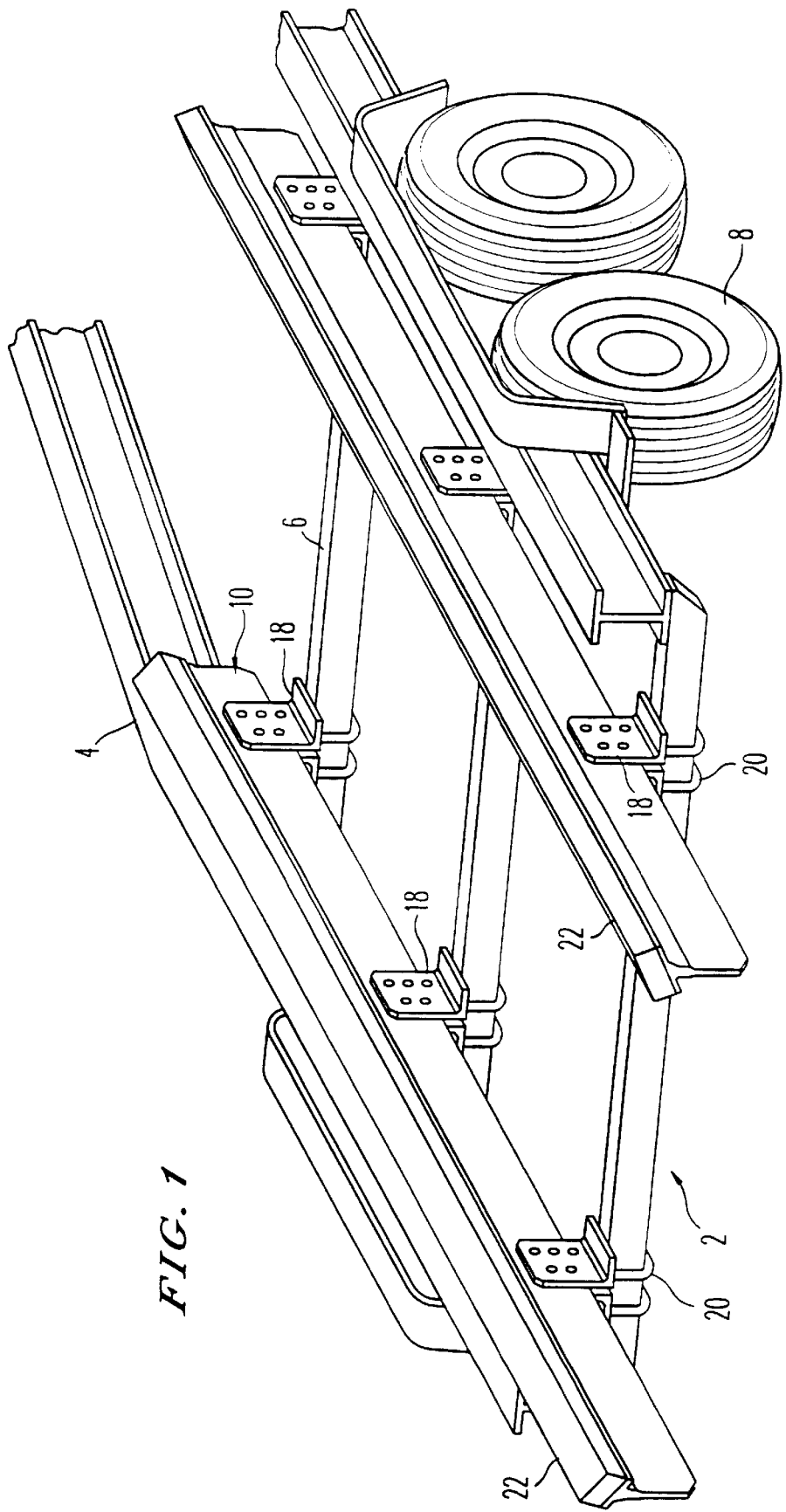
FIG. 1 is a perspective view of the relevant portion of a boat trailer incorporating bunks according to the invention.

A boat trailer incorporating bunks according to the invention is generally illustrated in FIG. 1. It includes conventional components, including a support frame 2 formed from side rails 4 and cross members 6 connected to the side rails by welding, bolting, riveting or any other desired means. The side rails 4 are formed in a conventional manner from I beam sections, and the cross members 6 are formed in a conventional manner from channel-shaped sections. A plurality of road wheels 8 support the support assembly 2, optionally via a suspension. A hitch (not shown) is provided at one end of the support frame for hitching the trailer to a vehicle for towing. Other conventional trailer components can also be provided.

Figure 2:
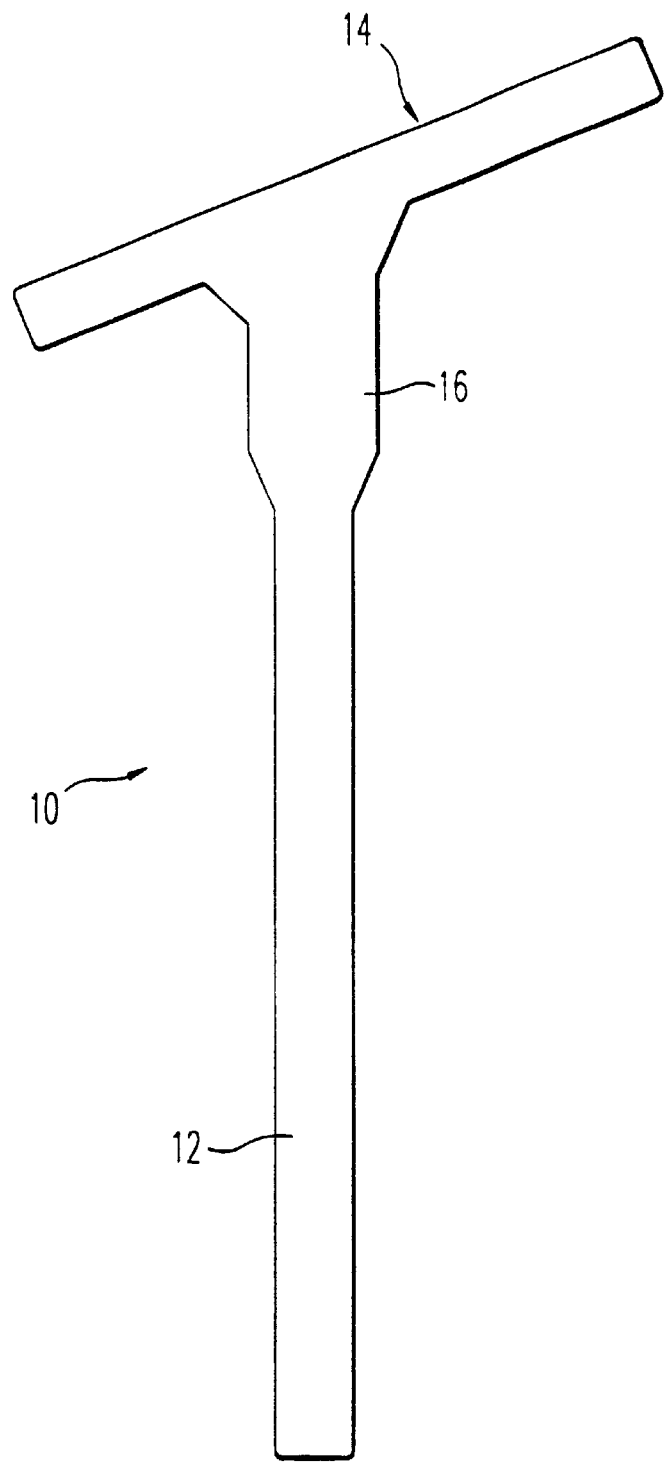
FIG. 2 is a cross-sectional view of an embodiment of a one piece bunk according to the invention.

The boat trailer also includes bunks which support the hull of a boat which is to be transported by the trailer. In this embodiment, the bunks are formed of T-shaped sections, at least part of which is formed of aluminum or an aluminum alloy. For example, in the one piece embodiment shown in FIGS. 1 and 2, the bunk 10 is formed as one piece from an aluminum section. The aluminum section may be, e.g., an extruded section formed in a conventional manner from a conventional aluminum or aluminum alloy material. It includes a base part 12 formed as one piece with the cross part 14. The base part 12 is generally formed as an elongate rectangular plate, as is the cross part 14. A reinforcement 16 is provided at a region of joinder of the base part with the cross part, for example by thickening the base part at the region of joinder.

The base part 12 is mounted to the support assembly 2 so as to be oriented vertically, for example by being clamped between the legs of a pair of brackets 18 which are bolted or riveted to opposite sides of the base part 12, as shown in FIG. 1. The brackets both support and reinforce the base part 12, and are adjustably mounted on the cross member 6, for example, by U-bolts 20.

FIG. 1 also illustrates caps 22 which may be formed of wood and bolted to the aluminum cross part 14. The caps may be covered with carpet and provide cushioning for the boat hull.

The cross part 14 may extend horizontally, or may be angled relative to the horizontal direction, depending upon the shape of the hull to be supported. For example, a hull supported at a planing straight requires a horizontal cross part 14 whereas a hull supported at a dead rise requires a cross part angled with respect to the horizontal direction.

In practice, the size, type and thickness dimensions of the aluminum bunk are selected to satisfy the size, shape and weight of the boat hull to be supported. The height of the base part is selected in view of the anticipated bending stresses produced by the weight of the boat hull. The brackets 18 not only position the bunk but reinforce the base part against buckling. The thickened reinforcement 16 protects against stress failure at the region of joinder between the base part and the cross part, resulting in a simple and inexpensive construction which adequately satisfies the requirements of a bunk without the shortcomings associated with wooden bunks.

Figure 3:
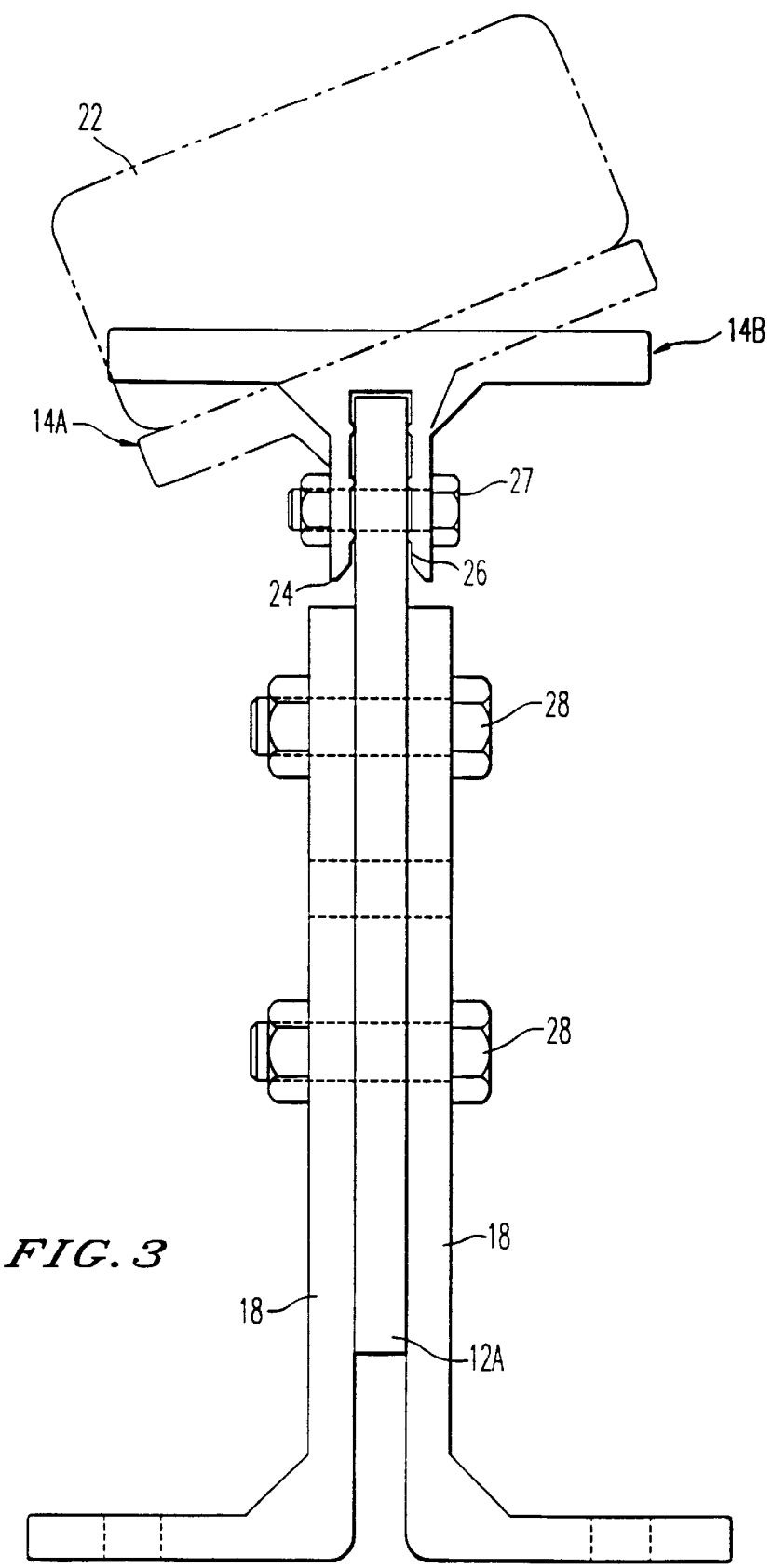
FIG. 3 is a sectional view of an embodiment of a two piece bunk according to the invention, including a cap.
Figure 4:
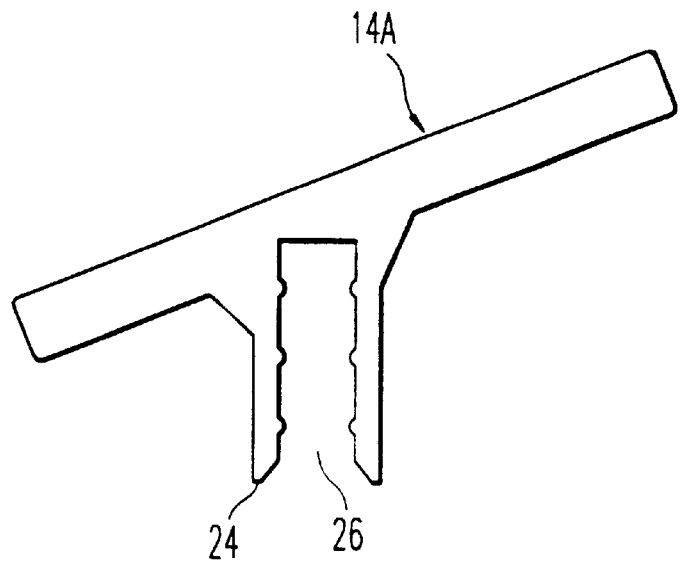
FIG. 4 is a detail of one embodiment of a cross part of the two piece bunk of FIG. 3.
Figure 5:
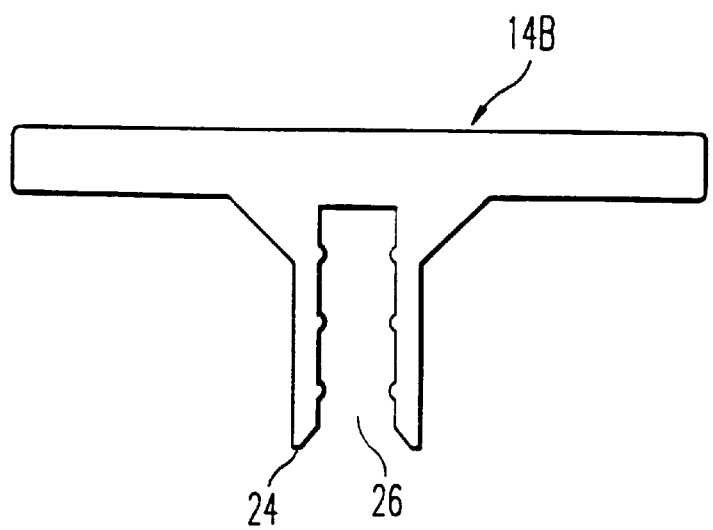
FIG. 5 is a detail of another embodiment of a cross part of a two piece bunk according to FIG. 3.

FIG. 3 illustrates a two-piece bunk construction, in which the base part 12A is formed as a simple elongated rectangular plate. Cross part 14 includes two integral yoke members 24 forming a groove 26 into which the top end of the base member 12A may be housed, and secured, e.g., by bolts 27. Bolts 28 can also be used for securing the legs of the brackets 18 to the base part. The yoke members 24 provide the reinforcement which is provided by the thickened portion 16 in the first embodiment. FIG. 4 shows a cross part 14A which is angled with respect to the horizontal, while FIG. 5 shows a cross piece 14B which extends horizontally.

An additional advantage of this second embodiment is that simple, standardized parts can be stored and selectively assembled to form the bunk. For example, standardized sizes of simple elongated rectangular aluminum plates can be stored for use as the base part 12A. A desired size and thickness of the base part can be selected, depending upon the size and strength requirements for a given use. A standard sized cross part 14A or 14B, which may be stored in advance, can then be bolted or otherwise secured to the base part 12A and standard sized brackets 18 can be used to secure the bunk to the support assembly 2 of the trailer. A simple and inexpensive method of assembly, using standardized parts, is thereby achievable.

Figure 6:
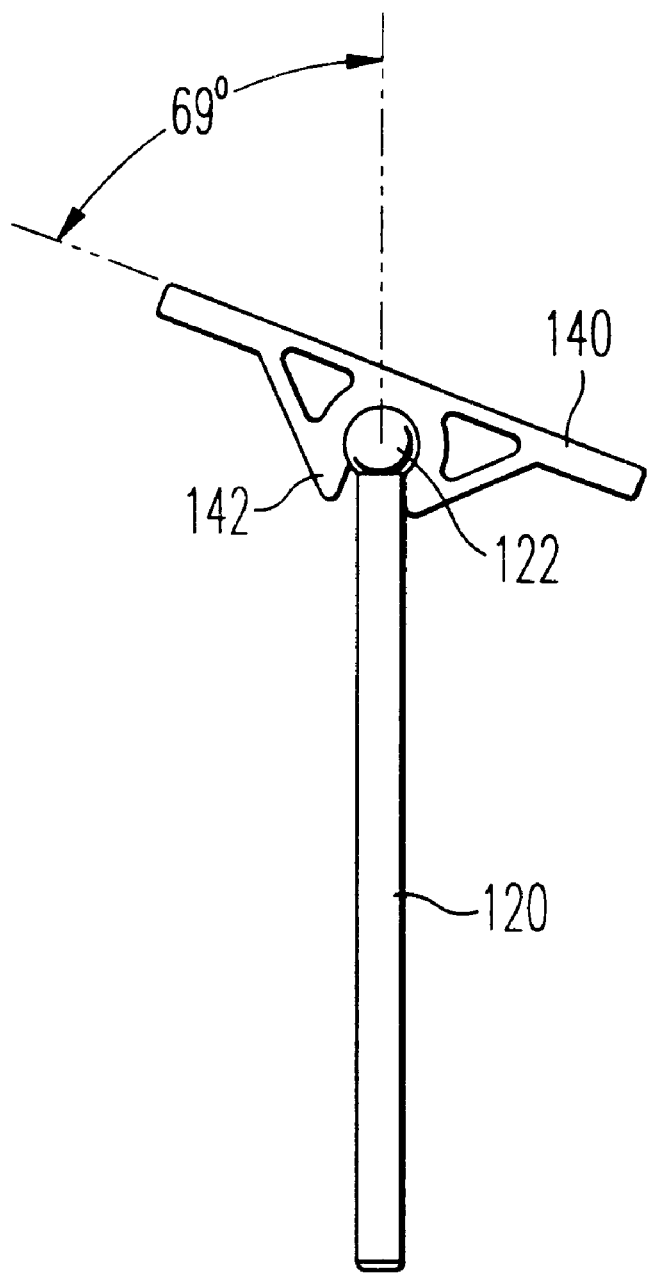
FIG. 6 is a detail of yet another embodiment of a cross part of a two piece bunk according to FIG. 3.

FIG. 6 illustrates an alternative form of a two-piece bunk construction, in which the base part 120 is formed as an elongated rectangular plate having an enlarged cylindrical head 122. Cross part 140 includes a yoke 142 forming a cylindrical housing which holds the enlarged cylindrical head 122 while permitting pivotal movement of the cross part between the between a horizontal orientation and an angled position which may be required by the shape of the boat hull. For example, in FIG. 6 the yoke is shaped to permit the cross part to pivot in one direction by 31° from the horizontal. This eliminates the need to change cross parts when using the same boat trailer for several boats having different hull shapes.

Obviously, numerous modifications and variations of the present invention are possible in light of the above teachings. It is therefore to be understood that the invention may be practiced otherwise than as specifically described herein.

What is claimed as new and is desired to be secured by Letters Patent of the United States is:

1. A boat trailer comprising:

an aluminum or aluminum alloy support assembly;

a plurality of road wheels for supporting said support assembly;

a hitch mechanism for hitching said support assembly to a vehicle; and a plurality of bunks supported by said support assembly for supporting a boat hull, said bunks extending longitudinally substantially in the direction of the length of the trailer, wherein at least one of said bunks is at least in part formed of aluminum or an aluminum alloy, wherein said at least one bunk has a substantially T shaped cross section, wherein said substantially T shaped cross section is comprised by a substantially vertically oriented base part mounted to said support assembly, and a cross part for supporting a boat hull, said cross part being pivotally mounted to said base part, further including at least one bracket mounting said base part to said support assembly.

2. The boat trailer of claim 1, including a protective cap mounted to a top of said cross part.

3. The boat trailer of claim 1, wherein said cross part extends substantially horizontally.

4. The boat trailer of claim 1, wherein said cross part extends at an angle to a horizontal direction.

5. The boat trailer of claim 1, wherein said base part comprises an elongate plate.

6. A boat trailer comprising:

an aluminum or aluminum alloy support assembly;

a plurality of road wheels for supporting said support assembly;

a hitch mechanism for hitching said support assembly to a vehicle; and a plurality of pivoting bunks supported by said support assembly, said bunks extending longitudinally substantially in the direction of the length of the trailer, wherein at least one of said bunks is comprised of aluminum or an aluminum alloy, and wherein said at least one bunk has a substantially T shaped cross section with a base part and a freely pivoting cross part.

* * * * *